United States Patent [19]
Pekrul

[11] 3,832,016
[45] Aug. 27, 1974

[54] TWO PIPE TRUCK TRAILER BRAKE SYSTEM WITH MEANS FOR APPLYING FRONT AND REAR TRAILER BRAKES UPON PULL-IN-TWO

[75] Inventor: Ewald Pekrul, Am Kappenberg, Germany

[73] Assignee: Westinghouse Bremsen-und Apparatebau, GmbH, Hannover, Germany

[22] Filed: July 12, 1973

[21] Appl. No.: 378,592

[52] U.S. Cl.................................. 303/40, 303/7
[51] Int. Cl.................................... B60t 15/02
[58] Field of Search............ 303/40, 28, 8, 52, 54, 303/7, 9, 13

[56] References Cited
UNITED STATES PATENTS

| | | | |
|---|---|---|---|
| 3,022,116 | 2/1962 | Hewitt | 303/28 |
| 3,068,050 | 12/1962 | Pekrul | 30/40 X |
| 3,450,154 | 6/1969 | Bueler | 303/40 X |
| 3,525,555 | 8/1970 | Meyer et al | 303/40 |

Primary Examiner—George E. A. Halvosa
Assistant Examiner—Barry L. Kelmachter
Attorney, Agent, or Firm—W. F. Poore; R. W. McIntire, Jr.

[57] ABSTRACT

This invention relates to a two-pipe dual brake apparatus for the trailer of a tractor-trailer vehicle in which a trailer control valve device has two coaxial and oppositely disposed pistons forming a chamber therebetween to which fluid under pressure may be supplied through one of the two pipes. These pistons operate a pair of supply and release valve mechanisms one of which controls the brakes on the rear wheels of the trailer and the other the brakes on the front wheels. A pair of storage reservoirs are provided on the trailer and charged from a compressor on the tractor. Fluid under pressure from one reservoir is supplied by one valve mechanism to operate the brakes for the front trailer wheels. Likewise, fluid under pressure from the other reservoir is supplied by the other valve mechanism to operate the brakes for the rear trailer wheels. The control valve device further comprises a third piston operable, upon the subsequent release, via a check valve, of fluid under pressure supplied thereto from the tractor, to effect operation of both valve mechanisms to thereby effect a brake application on both the front and rear wheels of the trailer.

6 Claims, 5 Drawing Figures

3,832,016

TWO PIPE TRUCK TRAILER BRAKE SYSTEM WITH MEANS FOR APPLYING FRONT AND REAR TRAILER BRAKES UPON PULL-IN-TWO

BACKGROUND OF THE INVENTION

In certain heretofore known tractor-trailer brake apparatus, if a pull-in-two occurred between the tractor and trailer, only the brakes on the front wheels of the trailer were automatically applied. If the trailer is heavily loaded when a pull-in-two occurs, an application of the brakes on only the front wheels does not provide a sufficient braking force on the trailer.

Accordingly, it is the general purpose of this invention to provide a novel two-pipe dual brake system for the trailer of a tractor-trailer vehicle having a trailer control valve device comprising a pair of piston-operated valve mechanisms for controlling respectively the brakes on the front and the rear wheels of the trailer and a third piston so operatively connected to both valve mechanisms as to cause the simultaneous operation thereof whereby, in response to the release of fluid under pressure from the third piston, this piston effects operation of both valve mechanisms so that a braking force is applied to both the front and the rear wheels of the trailer.

SUMMARY OF THE INVENTION

According to the present invention, a two-pipe dual brake apparatus for the trailer of a tractor-trailer vehicle comprises a novel trailer control valve device that has two coaxial and oppositely disposed pistons for respectively controlling the operation of a pair of supply and release valve mechanisms each of which controls the brakes on one pair of wheels of a four-wheel trailer. An emergency piston is so interlocked with the pair of valve mechanisms that the release of fluid under pressure from this emergency piston causes the operation of both valve mechanisms so that a braking force is applied simultaneously to both the front and the rear wheels of the trailer. In the accompanying drawings:

DESCRIPTION

Figure 1:
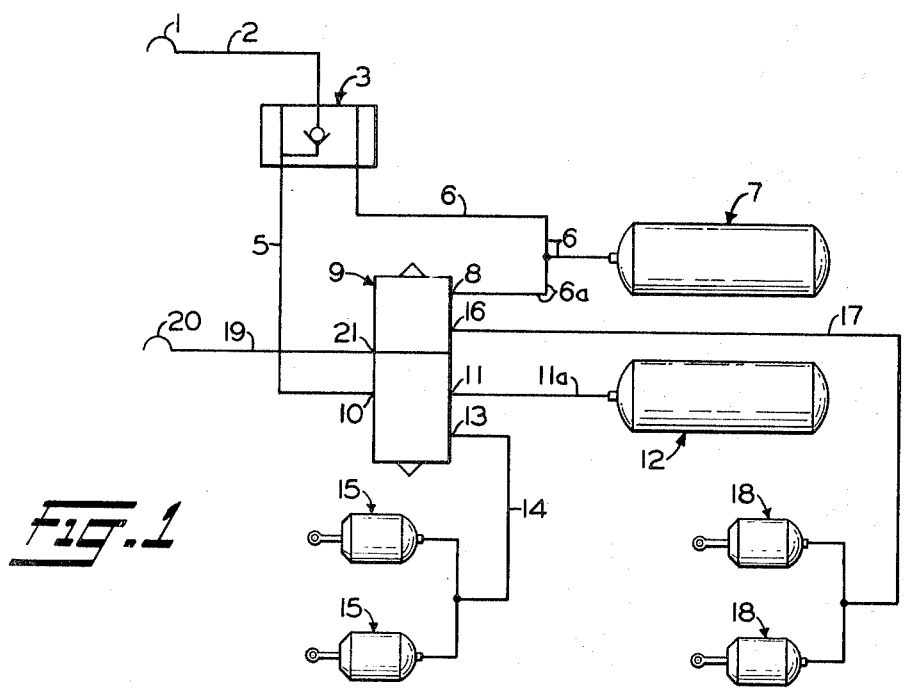
FIG. 1 is a piping diagram of a two-pipe dual brake system for the trailer of a tractor-trailer vehicle embodying the invention.

Referring to FIG. 1 of the drawings, a two-pipe dual brake apparatus for the trailer of a tractor-trailer vehicle comprises a hose coupling 1 that is secured to one end of a first pipe 2 on the trailer. The hose coupling 1 may be connected to a like hose coupling carried at one end of a pipe (not shown) on the tractor the opposite end of which pipe is connected to a source of fluid under pressure such as, for example, a fluid storage reservoir (not shown) on the tractor. The other end of the pipe 2 is connected to the inlet of a triple check valve device 3 on the trailer.

Figure 2:
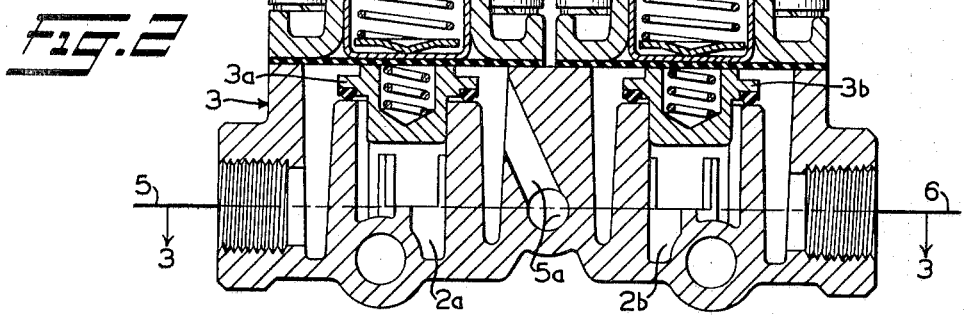
FIG. 2 is a vertical cross-sectional view of a triple check valve device that provides for charging of a pair of reservoirs carried on the trailer from a source of fluid under pressure on the tractor and a one-way flow of fluid under pressure from a novel control valve device carried on the trailer.
Figure 3:
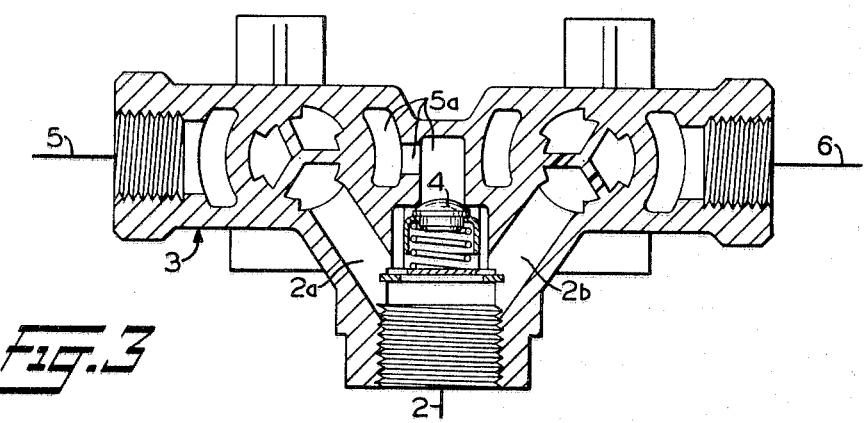
FIG. 3 is a horizontal cross-sectional view, taken along the line 3—3 of FIG. 2 and looking in the direction of the arrows, showing certain details of the triple check valve device not made apparent in FIGS. 1 and 2.

As shown in FIGS. 2 and 3, the fluid under pressure supplied from the storage reservoir on the tractor to the pipe 2 on the trailer flows via a passageway 2a and past a first spring-loaded check valve 3a to a pipe 5, and via a passageway 2b and past a second spring-loaded check valve 3b to a pipe 6.

Moreover, as shown in FIGS. 2 and 3, the body of the check valve device 3 is further provided with a passageway 5a that connects the pipe 5 to the inlet side of a third spring-loaded check valve 4 that opens in the direction of the pipe 2. This check valve 4 thus provides for flow of fluid under pressure therepast from the pipe 5 to the pipe 2.

Figure 4:
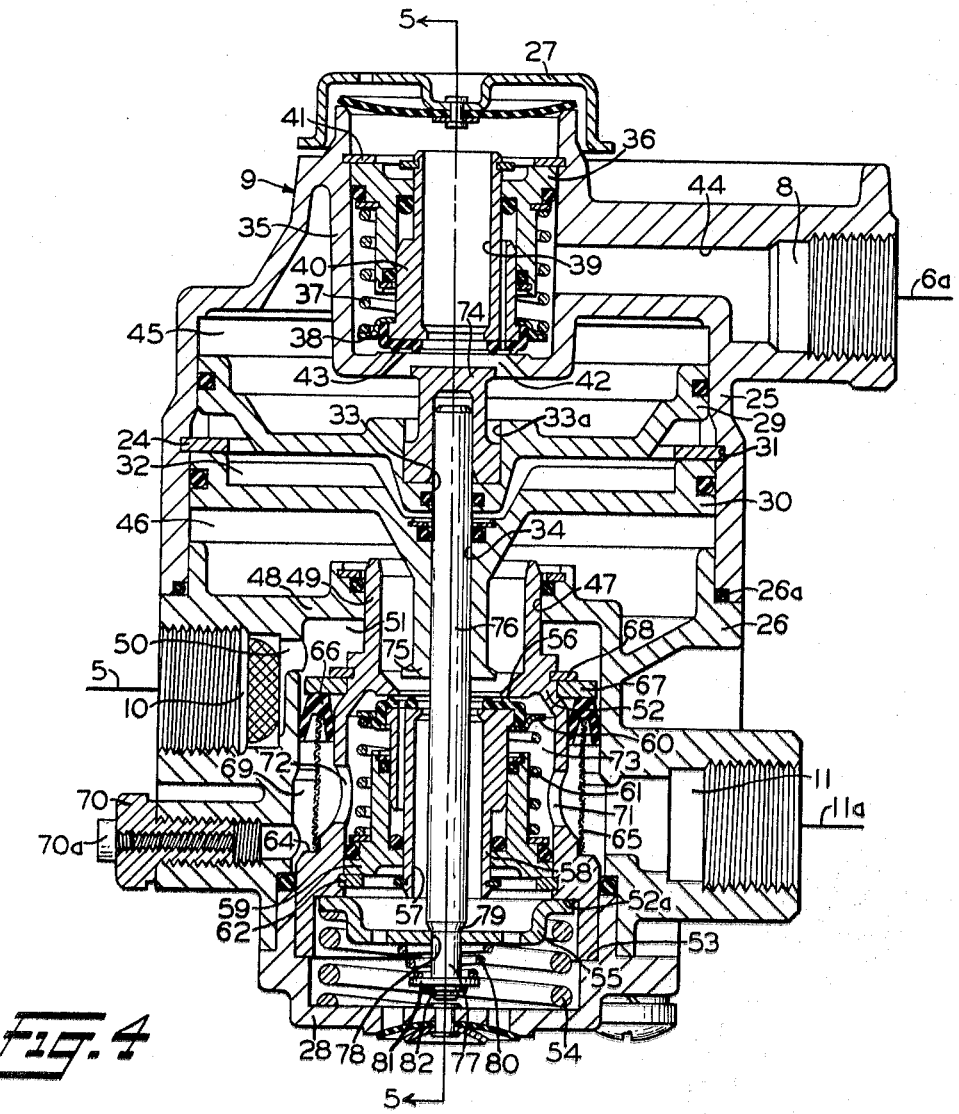
FIG. 4 is a vertical cross-sectional view of a novel trailer control valve device for controlling the brakes on both the front and rear wheels of the trailer.

As shown in FIG. 1, the pipe 6 is connected to a first storage reservoir 7. A branch pipe 6a connects the pipe 6 to a supply port 8 of a trailer control valve device 9 shown in section in FIGS. 4 and 5. As shown in FIG. 4, the above-mentioned pipe 5 is connected to an inlet port 10 of the trailer control valve device 9. An outlet port 11 of the control valve device 9 is connected by a pipe 11a to a second storage reservoir 12 (FIG. 1).

Figure 5:
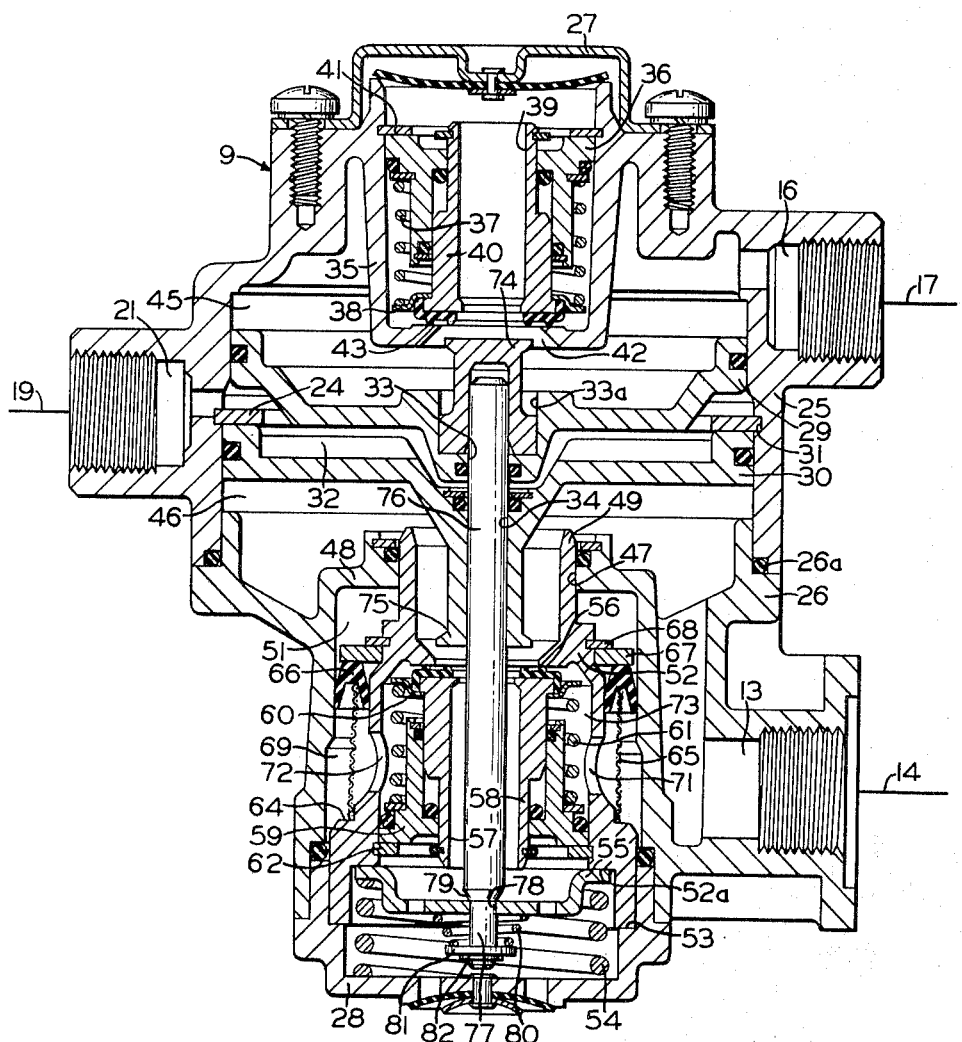
FIG. 5 is a vertical cross-sectional view, taken along the line 5—5 of FIG. 4 and looking in the direction of the arrows, showing further structural details of the trailer control valve device not made apparent in FIG. 4.

As shown in FIG. 5, the trailer control valve device 9 has a first delivery port 13 that is connected by a pipe 14 to a pair of brake cylinders 15 (FIG. 1) for the front wheels of the trailer, and a second delivery port 16 that is connected by a pipe 17 to a pair of brake cylinders 18 (FIG. 1) for the rear wheels.

As may be seen from FIG. 1, a second pipe 19 on the trailer is connected at one end to a hose coupling 20 that may be coupled to a like hose coupling (not shown) on the tractor carried at one end of a pipe having its opposite end connected to some suitable operator's brake valve device (not shown) on the tractor, the manual operation of which effects the supply of fluid under pressure to the pipe 19. The opposite end of this pipe 19 is connected to a control port 21 (FIGS. 1 and 5) of the trailer control valve device 9.

The trailer control valve device 9 is shown in its brake release position in FIGS. 4 and 5, it being noted that the body of this valve device 9 comprises an upper casing section 25 and a lower casing section 26 secured one to the other by any suitable means (not shown), there being a resilient sealing member or gasket 26a disposed therebetween. Secured to the upper end of the upper casing section 25 is an insect excluder device 27 and secured to the lower end of the lower casing section 26 is a second insect excluder device 28 through which fluid under pressure flows from the brake cylinders to atmosphere when effecting a brake release on the trailer.

As shown in FIGS. 4 and 5, a pair of coaxial and oppositely disposed valve-operating pistons 29 and 30 are slidably mounted in bores provided therefor in the upper casing section 25. A snap ring 24 carried in a groove 31 provided therefor in this upper casing 25 limits movement of the pistons 29 and 30 in the direction of each other whereby these pistons cooperate with the casing section 25 to form a pressure chamber 32 to which fluid under pressure may be supplied from the operator's brake valve device on the tractor via hose coupling 20 (FIG. 1), pipe 19, and control port 21.

The upper piston 29 is provided with a bore 33 and a coaxial counterbore 33a, and the lower piston 30 is provided with a bore 34, the purposes of these bores being hereinafter explained.

Formed integral with the upper casing section 25 is a cup-shaped member 35 having at its lower end an inturned flange. Disposed within the cup-shaped member 35 is a first annular spring seat 36. A spring 37 is interposed between this spring seat 36 and a second annular spring seat 38. A bore 39 extends through an annular exhaust and supply valve element 40 that is slidably mounted in a counterbore provided therefore in the spring seat 36 and has at its lower end an outturned flange against which rests the second annular spring seat 38. A snap ring 41 inserted in a groove provided therefore in the cup-shaped member 35 retains the spring seats 36 and 38, spring 37 and valve element 40 therein so that the spring 37 normally biases the valve element 40 to the position in which an opening 42 extending through a supply valve seat 43 formed by the inturned flange at the lower end of the cup-shaped member 35 is closed. Thus, flow of fluid under pressure from the reservoir 7 (FIG. 1) to atmosphere via the pipe 6, branch pipe 6a, a bore 44 (FIG. 4) in the upper casing section 25 and the bore 39 is cut off.

Referring to FIGS. 1 and 5, it will be seen that a chamber 45 above the piston 29 is connected to the rear brake cylinders 18 via the delivery port 16 and pipe 17, and a chamber 46 below the piston 30 is connected to the front brake cylinders 15 via the delivery port 13 and pipe 14.

As shown in FIGS. 4 and 5, a bore 47 extends through a wall 48 that is formed integral with the lower casing section 26 and has a sleeve member 49 extending therethrough. An opening 50 (FIG. 4) provided in the lower casing section 26 connects the hereinbeforementioned inlet port 10 to a chamber 51 above an annular emergency piston 52 that at its upper end is formed integral with the sleeve 49 and normally has its lower end resting against a shoulder 53 formed on the lower insect excluder device 28. A spring 54 that at one end rests on the insect excluder device 28 biases a ported cup-shaped member 55 against a shoulder 52a formed on the emergency piston 52.

An annular flat valve seat 56 is formed on an inturned flange that is integral with the upper end of the annular emergency piston 52 adjacent the lower end of the sleeve member 49. A bore 57 extends through an annular exhaust valve member 58 that is slidably mounted in an annular spring seat member 59, and interposed between this spring seat member 59 and a spring seat 60 is a spring 61 that is effective to normally bias the exhaust valve member 58 against the flat valve seat 56 and the spring seat member 59 against a snap ring 62 that is carried in a groove provided therefor in the emergency piston 52.

As shown in FIGS. 4 and 5 of the drawings, a shoulder 64 formed on the emergency piston 52 supports one end of an annular filter 65 that may be constructed of, for example, screen wire. A V-shaped check valve 66, that is constructed of some resilient material such as, for example, rubber, is interposed between the upper end of the filter 65 and an annular member 67 that is secured to the emergency piston 52 by a snap ring 68.

Formed between the lower casing section 26 and the outside of the filter 65 and below the check valve 66 is an annular chamber 69. As shown in FIG. 4, an internally threaded pipe fitting 70 is provided with external screw threads that have screw-threaded engagement with internal screw threads provided in the lower casing section 26, the purpose of this fitting 70 being to receive a manually operative release valve device (not shown) the manually operation of which will effect a brake application on the trailer. A removable screw-threaded plug 70a is normally carried by this fitting 70.

As further shown in FIG. 5, the annular chamber 69 is connected via a pair of diametrically opposite ports 71 and 72 provided in a skirt portion of the emergency piston 52 to an annular chamber 73 within this skirt portion.

Moreover, the annular chamber 69 is connected to the reservoir 12 via outlet port 11 and the pipe 11a (FIG. 4). Therefore, the reservoir 12 on the trailer will be charged from the storage reservoir on the tractor via the pipe and hose coupling on the tractor that is connected to the trailer hose coupling 1 (FIG. 1), this hose coupling 1, pipe 2 spring-loaded check valve 3a (FIG. 2), pipe 5 (FIGS. 1 to 4 inclusive), inlet port 10 (FIG. 4), opening 50, chamber 51, past resilient check valve 66, annular chamber 69, outlet port 11 and pipe 11a.

As shown in FIGS. 4 and 5, a cup-shaped valve stem 74 is slidably disposed in the counterbore 33a in the piston 29 the upper end of this stem 74 constituting an exhaust valve, and a valve stem 75, the lower end of which constitutes a second exhaust valve, is formed integral with the piston 30 and extends from the lower side thereof, it being noted that the hereinbeforementioned bore 34 extends through this stem 75.

Furthermore, as can be seen from FIGS. 4 and 5, an emergency brake rod 76, the upper end of which is press fitted into the cup-shaped valve stem 74, slidably extends through the bores 33 and 34 in the respective pistons 29 and 30 and the bore 57 in the exhaust valve member 58. A lower end portion 77 of the brake rod 76 has a smaller diameter than the remainder of this rod so as to extend through a bore 78 provided therefor in the hereinbefore-mentioned cup-shaped member 55, the upper end of portion 77 having a conical surface 79 that is biased against the periphery of the bore 78 by a spring 80 that is disposed about the portion 77 and interposed between the lower side of the cup-shaped member 55 and an annular spring seat 81 that rests against a snap ring 82 inserted in a groove provided therefor in the portion 77.

OPERATION

Fluid under pressure supplied from the storage reservoir on the tractor to the pipe 2 on the trailer flows past the check valve 3b (FIG. 2) to the pipe 6 (FIG. 1) and thence to the reservoir 7 to charge this reservoir. Fluid under pressure also flows from the pipe 2 past the check valve 3a (FIG. 2) to the pipe 5 and thence to the reservoir 12 via inlet port 10 (FIG. 4), opening 50, chamber 51, past check valve 66, annular chamber 69, outlet port 11 and pipe 11a. Consequently, reservoirs 7 and 12 on the trailer are charged to substantially the same pressure as the pressure of the fluid in the storage reservoir on the tractor.

During normal driving of the tractor-trailer vehicle with the brakes released, the parts of the trailer control valve device 9 will occupy the position shown in FIGS. 4 and 5. Consequently, fluid under pressure will flow from the reservoir 7 to the interior of cup-shaped member 35 via pipe 6, branch pipe 6a, supply port 8 (FIG. 4) and bore 44, it being noted that spring 37 seats valve element 40 on valve seat 43 to prevent flow of fluid under pressure to the chamber 45.

Furthermore, fluid under pressure from the storage reservoir on the tractor flows to the chamber 51 to maintain the skirt portion of the emergency piston 52 against the shoulder 53 (FIGS. 4 and 5) via hose coupling 1, pipe 2 (FIG. 1), check valve 3a (FIG. 2), pipe 5, inlet port 10 (FIG. 4) and port 50. In this position of emergency piston 52, the valve stem 75 is unseated from exhaust valve member 58. Consequently, the front brake cylinders 15 (FIG. 1) are open to atmosphere via pipe 14, delivery port 13 (FIG. 5), chamber 46, interior of sleeve 49, bore 57 in valve member 58, the ported member 55 and lower insect excluder device 28.

Since valve stem 74 is now disposed out of contact with valve element 40, as shown in FIGS. 4 and 5, the rear brake cylinders 18 (FIG. 1) are open to atmosphere via pipe 17, delivery port 16 (FIG. 5), chamber 45, opening 42, bore 39 in valve element 40 and upper insect excluder device 27.

If now the driver of the tractor operates the brake valve device on the tractor to supply fluid under pressure to the chamber 32 in the trailer control valve 9 via trailer hose coupling 20, pipe 19 and control port 21, the pistons 25 and 30 will be moved in opposite directions.

Upward movement of piston 29 first moves valve stem 74 into contact with the lower end of valve element 40 to close communication between the rear brake cylinders 18 and atmosphere. Continued upward movement of piston 29 and valve stem 74 lifts valve element 40 upward from supply valve seat 43 whereupon fluid under pressure flows from the reservoir 7 (FIG. 1) to the rear brake cylinders 18 via pipe 6, branch pipe 6a, supply port 8 (FIG. 4), bore 44, interior of cup-shaped member 35, opening 42 in supply valve seat 43, chamber 45, delivery port 16 (FIG. 5) and pipe 17.

Since the upper end of the emergency brake rod 76 is press-fitted into the cup-shaped valve stem 74, as hereinbefore stated, the rod 76 is moved upward with the piston 29 against the yielding resistance of the spring 80.

The downward movement of the piston 30 first seats the lower end of valve stem 75 on the upper end of valve member 58 to close communication between the front brake cylinders 15 and atmosphere. Continued downward movement of piston 30 and valve stem 75 moves valve member 58 downward away from valve seat 56 whereupon fluid under pressure flows from the reservoir 12 (FIG. 1) to the front brake cylinders 15 via pipe 11a, outlet port 11 (FIG. 4), annular chamber 69, filter 65, ports 71 and 72, chamber 73, past valve seat 56, interior of sleeve member 49, chamber 46, delivery port 13 (FIG. 5) and pipe 14.

As the pressure in the chambers 45 and 46 increases to that in the chamber 32, the pistons 29 and 30 will be moved to a lap position to cut off flow of fluid under pressure to the brake cylinders 15 and 18.

If the driver of the tractor now operates the brake valve device on the tractor to release fluid under pressure from the chamber 32 to atmosphere, the pistons 29 and 30 will be returned to the position shown by the pressure in the chambers 45 and 46.

Consequently, the valve stem 74 will be moved downward by the emergency brake rod 76 and spring 80 to the position shown out of contact with valve element 40 which is then seated by spring 37 on valve seat 43. Fluid under pressure will now be vented from the rear brake cylinders 18 to atmosphere via the bore 39 and upper insect excluder device 27.

Likewise, valve stem 75 will be moved upward to the position shown out of contact with valve member 58 which is then seated by spring 61 on valve seat 56. Fluid under pressure will now be vented from the front brake cylinders 15 to atmosphere via the bore 57 and lower insect excluder device 28.

If the trailer hose coupling 1 be manually uncoupled from the tractor hose coupling (not shown), or should a rupture occur in the pipes 2 or 5 on the trailer or the pipe on the tractor to which the pipe 2 is connected by the trailer hose coupling 1, fluid under pressure from the chamber 51 (FIGS. 4 and 5) will be released to atmosphere via the opening 50, inlet port 10 and the point of rupture in that one of the pipes that has ruptured, it being noted that the check valve 4 (FIG. 3) provides for flow of fluid under pressure from the pipe 5 to the pipe 2 if the point of rupture is in the pipe 2 or the pipe on the tractor to which this pipe 2 is connected by the trailer hose coupling 1.

When fluid under pressure is thus released from the chamber 51 to atmosphere, the spring 54 will move the emergency piston 52, spring seat member 59, spring 61, exhaust valve member 58 and cup-shaped member 55 upward, it being noted that this upward movement of member 55 is transmitted to emergency brake rod 76 via the conical surface 79 on this rod.

This upward movement of exhaust valve member 58 brings it into contact with the lower end of valve stem 75 after which valve seat 56 is moved upward from the valve member 58, it being understood that valve stem 75 prevents further upward movement of member 58.

Upon upward movement of valve seat 56 away from valve member 58, fluid under pressure from the reservoir 12 (FIG. 1) will flow to the front brake cylinders 15 via pipe 11a, port 11 (FIG. 4), annular chamber 69, filter 65, ports 71 and 72, chamber 73, interior of sleeve member 49, chamber 46, delivery port 13 (FIG. 5) and pipe 14.

The above-mentioned upward movement of the emergency brake rod 76 moves the valve stem 74 upward therewith until this stem contacts valve element 40 after which this element is moved upward by the valve stem 74.

Upon upward movement of valve element 40 away from supply valve seat 43, fluid under pressure from the reservoir 7 (FIG. 1) flows to the rear brake cylinders 18 via pipe 6, branch pipe 6a, supply port 8 (FIG. 4), bore 44, interior of cup-shaped member 35, opening 42, chamber 45, delivery port 16 (FIG. 5) and pipe 17.

From the foregoing, it is apparent that when fluid under pressure is vented from the chamber 51 above emergency piston 52, fluid under pressure is simultaneously supplied to the front brake cylinders 15 and the rear brake cylinders 18 to apply a braking force to all of the wheels on the trailer.

If the trailer has been uncoupled from the tractor and a brake application on the trailer effected in the manner described above, this brake application may be released by removing the screw-threaded plug 70a from the fitting 70 (FIG. 4) and connecting a manually operative release valve device (not shown) of any known construction to this fitting 70 in place of the plug 70a.

Manual operation of this release valve device to its release position will establish a communication between the chamber 51 and atmosphere via the check valve 66, annular chamber 69, fitting 70 and this release valve device.

Upon the release of fluid under pressure from the chamber 51 above the emergency piston 52 to atmosphere, a brake application on all the wheels of the trailer will be effected in the manner described above.

Having now described the invention what I claim as new and desire to secure by Letters Patent, is:

1. For use in a two-pipe dual brake apparatus for a trailer of a tractor-trailer vehicle having separate brake applying means for the front and rear wheels of the trailer, a trailer control valve device operable responsively to variations of pressure of a fluid in either one of the two pipes to effect the supply of fluid under pressure to both of the brake applying means to cause a brake application on the front and rear wheels of the trailer, said trailer control valve device comprising:
   a. a pair of valve means for controlling respectively the supply of fluid under pressure to and the release of fluid under pressure from said separate brake applying means to effect a brake application and a brake release on the front and rear wheels of the trailer,
   b. a pair of oppositely arranged abutments cooperating to form a chamber therebetween to which chamber fluid under pressure may be supplied and released via one of the two pipes whereby shifting of said pair of abutments in opposite directions effects the operation of both of said valve means,
   c. biasing means, and
   d. a third abutment subjectable on one side to fluid under pressure in the other one of said two pipes and on the other side to said biasing means and so operatively associated with said pair of valve means as to cause operation of both of said valve means in response to the release of fluid under pressure from said one side of said third abutment whereby a brake application is simultaneously effected on both the front and the rear wheels of the trailer.

2. For use in a two-pipe dual brake apparatus for a tractor-trailer vehicle, a trailer control valve device, as recited in claim 1, further characterized by one-way flow valve means for providing for flow of fluid under pressure from said one side of said third abutment to said other side and preventing flow from said other side to said one side.

3. For use in a two-pipe dual brake apparatus for a tractor-trailer vehicle, a trailer control valve device, as recited in claim 1, further characterized in that one of said pair of valve means is carried by said third abutment in such a position relative to one of said pair of abutments that movement of said third abutment and said one valve means carried thereby in the direction of said one abutment in response to said release of fluid under pressure from said one side of said third abutment causes said one abutment to operate said one valve means, and a member having a resilient connection with said third abutment is effective to simultaneously operate the other of said pair of valve means independently of the other of said pair of abutments whereby a brake application is effected simultaneously on the front and the rear wheels of the trailer upon said release of fluid under pressure from said one side of said third abutment.

4. For use in a two-pipe dual brake apparatus for a tractor-trailer vehicle, a trailer control valve device, as recited in claim 3, further characterized in that said resilient connection comprises:
   a. an annular member interposed between said biasing means and said third abutment,
   b. a rod extending through said annular member and having a shoulder adjacent one end thereof, the opposite end being so disposed as to effect operation of said other valve means, and
   c. resilient means interposed between said annular member and said one end of said rod, said resilient means being normally effective to bias said shoulder on said rod against said annular member whereby said release of fluid under pressure from said one side of said third abutment renders said biasing means effective to cause shifting of said third abutment relative to said pair of abutments whereby said rod effects the operation of said other valve means simultaneously as said one of said pair of valve means carried by said third abutment is operated by said one abutment to cause concurrent supply of fluid under pressure to both of said brake applying means.

5. For use in a two-pipe dual brake apparatus for a tractor-trailer vehicle, a trailer control valve device, as recited in claim 4, further characterized in that said rod slidably extends through said pair of oppositely arranged abutments, and said opposite end of said rod carries a stop member to limit movement in one direction of said other abutment relative to said rod whereby said other abutment is effective to shift said rod and said stop member in said one direction in response to the supply of fluid under pressure to said chamber to render said other abutment effective to operate said other valve means via said stop member simultaneously as said one abutment effects operation of said one valve means thereby to cause a brake application simultaneously on both the front and rear wheels of the trailer.

6. For use in a two-pipe dual brake apparatus for a tractor-trailer vehicle, a trailer control valve device, as recited in claim 4, further characterized in that said rod slidably extends through said pair of oppositely arranged abutments, and said opposite end of said rod carries a stop member to limit movement in one direction of said other abutment relative to said rod whereby said third abutment is effective to shift said rod and said stop member in said one direction relative to said pair of abutments in response to said release of fluid under pressure from said one side of said third abutment to render said stop member effective to operate said other valve means simultaneously as said one valve means carried by said third abutment is operated by said one abutment to cause a brake application simultaneously on both the front and rear wheels of the trailer.

* * * * *